June 17, 1958  W. J. KELLY, JR., ET AL  2,839,163
EMERGENCY BRAKE FOR VEHICLES
Filed March 23, 1955
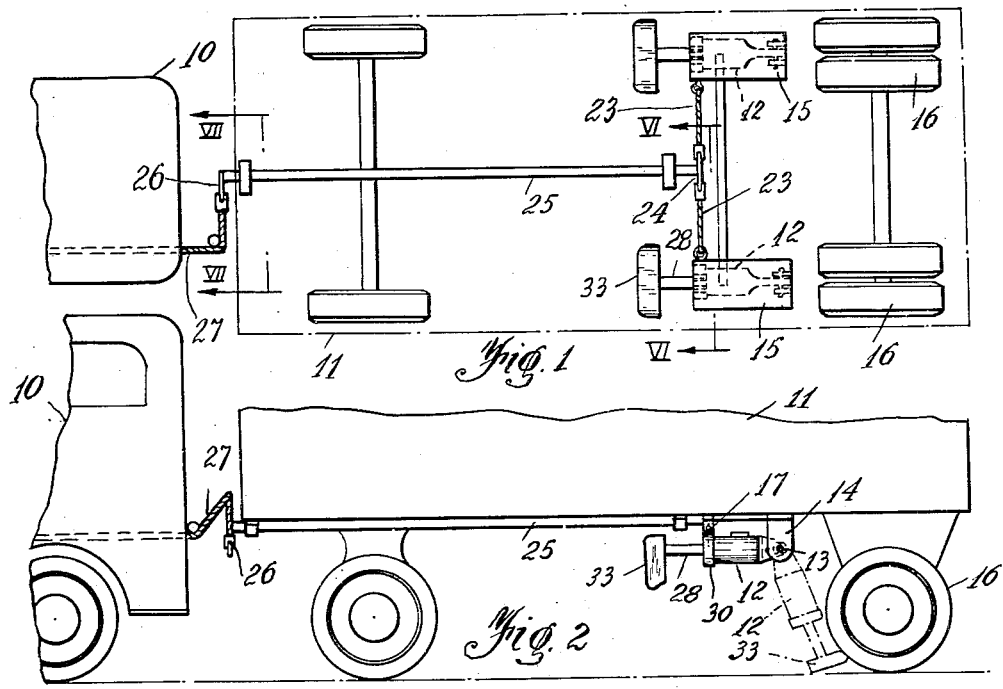
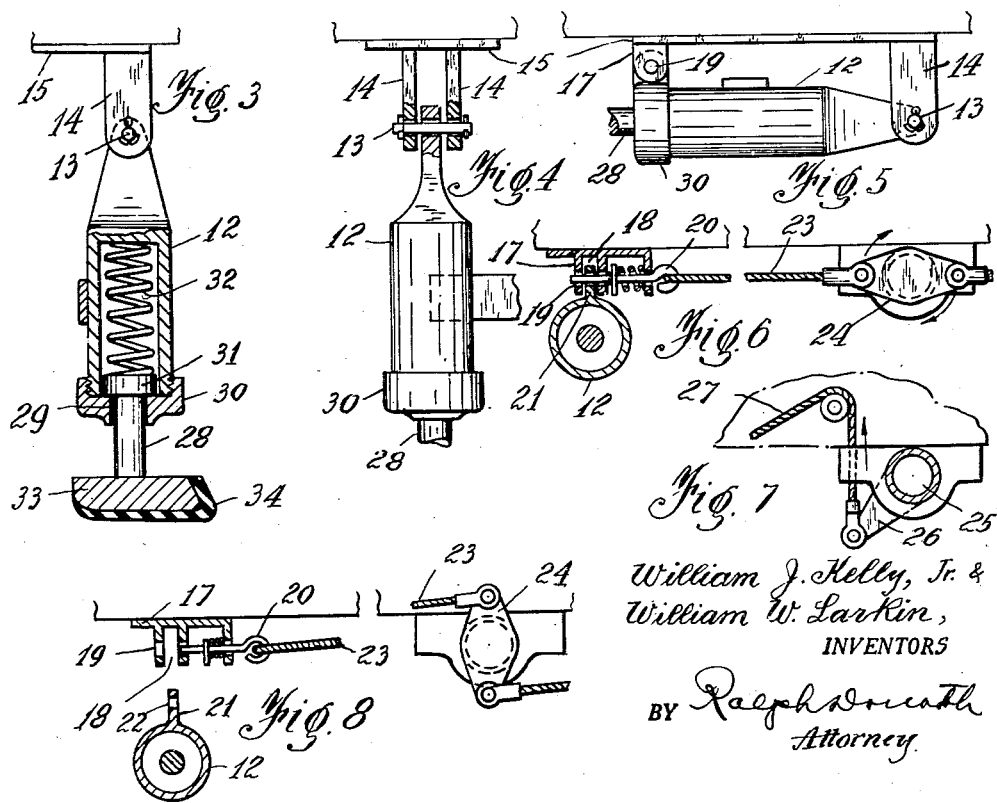
William J. Kelly, Jr. &
William W. Larkin,
INVENTORS
BY Ralph Dunsmith
Attorney United States Patent Office 2,839,163
Patented June 17, 1958

2,839,163
EMERGENCY BRAKE FOR VEHICLES

William J. Kelly, Jr., and William W. Larkin, Pittsburgh, Pa.

Application March 23, 1955, Serial No. 496,154

4 Claims. (Cl. 188—4)

This invention relates to emergency brakes for trucks and the like vehicles and is particularly adapted for emergency use on large trailer trucks and similar heavily loaded vehicles.

There has for a long period of time, been a great need for an emergency brake which would become effective when other brakes failed or for some reason refused to function. Many lives have been lost and large amounts of money lost by reason of failure of brakes on heavily loaded vehicles. Various sorts of emergency brakes have been heretofore proposed, some operating on the conventional vehicle brake bands in the manner of an auxiliary energizing system, some providing an auxiliary brake shoe and still others depending on complex methods of inserting a wedge beneath the vehicle wheel. The present invention departs from these previously proposed mechanisms and provides an emergency brake which is completely independent of the conventional braking system and is simple, economical and efficient.

It is accordingly an object of the present invention to provide an emergency braking device having a braking shoe which acts simultaneously on the wheel and on the road surface.

Another object of this invention is to provide an emergency braking device having a braking shoe which cooperates with the vehicle wheels to frictionally engage the road surface and the wheel without removing the wheel from contact with the road whereby additional braking surface on the road surface is obtained.

A further object of the present invention is to provide a simple braking mechanism which is operable by simply pulling a cable, and requires no power for energizing other than the forward movement of the vehicle itself.

Other objects, advantages and purposes of this invention will be apparent from a consideration of the following description and the accompanying drawings in which:

Figure 1 is a top view of a truck trailer incorporating the brake of this invention.

Figure 2 is a side elevation of the truck of Figure 1.

Figure 3 is a longitudinal section through an emergency brake member used in Figure 1.

Figure 4 is a fragmentary front elevation of the brake member of Figure 3.

Figure 5 is a side elevation of the brake member of Figures 3 and 4 in the inoperative position.

Figure 6 is a section on the line VI—VI of Figure 1.

Figure 7 is a section on the line VII—VII of Figure 1.

Figure 8 is a section on the same line as Figure 6 immediately after the emergency brake is made operative.

Referring to the drawings there is illustrated a truck cab 10 having attached thereto a semi-trailer 11 of conventional design. A hollow cylindrical member 12 is pivoted on a pin 13 held between plates 14 on a base 15 fixed to the frame of the trailer in front of the wheels 16. A bracket 17 is fixed on the base 15 forward of the plates 14 and is provided with a slot 18 and holes 19 through which a springloaded pin 20 is adapted to pass.

The cylinder 12 is provided with a tongue 21 having a hole 22 corresponding to the holes 19 and adapted to receive the pin 20. Each of the pins 20 is provided with a cable release line 23 connected to a crank arm 24 on the end of a shaft 25. The opposite end of the shaft 25 is provided with a second crank arm 26 connected to a cable 27 going to the cab 10.

A plunger 28 is slidably mounted in an opening 29 in the cap 30 of the cylindrical member 12. An enlarged head 31 on the plunger 28 is slidable with the cylindrical member 12 as a piston and is biased toward the open end of the cylindrical member 12 by a spring 32. The end of the plunger 28 opposite to the head 31 is provided with a shoe 33 covered with frictional material 34.

The operation of the emergency brake of this invention is as follows: In the event of an emergency the cable 27 is pulled by the operator in the cab 10. This causes the crank 26 to be rotated and thereby rotate the crank 24 through the shaft 25. When the crank 24 rotates, the cables 23 exert pull on the pins 20 to remove them from the opening 22 in the tongue 21 thus releasing the cylindrical member 12. The cylindrical member 12 then rotates on the pin 13 until the friction material 34 on the shoe 33 engages the surface of the road in advance of the wheel 16. Continued forward movement of the vehicle causes the spring 32 to be compressed and the plunger 28 to move inwardly into the cylindrical member 12. This acts to provide a mild braking action in overcoming the resistance of the spring 12. If the vehicle continues to move forward the plunger 28 passes through the vertical position and is moved outwardly by the spring to bring the shoe 33 in front of the wheels 16 (see chain lines in Figure 2). In this position the friction material 134 simultaneously engages the road surface and the tire surface thereby retarding the rotation of the wheels and causing it to engage the road surface in braking engagement.

When it is desired to release the brake of the invention, the vehicle is moved in reverse to carry the shaft and shoe back through the vertical position and the cylindrical members are raised and the pin 20 reinserted in the opening 22 in the tongue 21 on the cylindrical member 12. The emergency brake is then ready for use.

While a preferred embodiment of this invention has been illustrated and described above, it will be understood that this invention may be otherwise variously embodied within the scope of the following claims.

We claim:

1. An emergency brake for wheeled vehicles comprising a cylinder pivotally suspended beneath the vehicle frame in front of a wheel, a resiliently mounted plunger reciprocable in said cylinder, latch means holding the cylinder with the plunger adjacent the vehicle frame, release means actuating the latch means to release the cylinder, a shoe on the end of the plunger remote from the cylinder pivot, said shoe being adapted to contact the road surface in advance of a wheel and reciprocate the plunger in the cylinder to bring the shoe into simultaneous contact with the road surface and the wheel at a portion thereof other than the road engaging portion whereby the shoe and wheel are in simultaneous contact with the road.

2. An emergency brake for wheeled vehicles as claimed in claim 1 wherein the plunger is provided with a spring mounting urging the plunger out of the cylinder.

3. An emergency brake for wheeled vehicles comprising a bracket fixed to the vehicle frame, a cylinder pivoted in said bracket, a plunger reciprocable in said cylinder through the end opposite the pivot, stop means on the end of the cylinder remote from the bracket limiting the movement of the plunger in said cylinder, resilient means urging said plunger out of the cylinder, cooperating latch means on the cylinder and vehicle frame releasably holding the plunger out of contact with a road surface and shoe means on the end of the plunger remote from the cylinder adapted to engage the road surface when the latch means is released to force the plunger into the cylinder and thereafter force the shoe means into engagement between the road surface and that portion of the wheel periphery directly above the road surface.

4. An emergency brake for wheeled vehicles as claimed in claim 3 wherein the plunger is provided with an enlarged head movable in the cylinder and spring means bearing on said head urging the plunger out of the cylinder.

References Cited in the file of this patent

UNITED STATES PATENTS

| | | |
|---|---|---|
| 898,082 | Wolfe | Sept. 8, 1908 |
| 1,117,753 | Anderson | Nov. 17, 1914 |
| 1,334,807 | Siebachmeier | Mar. 23, 1920 |
| 1,893,580 | Colley | Sept. 11, 1931 |

FOREIGN PATENTS

| | | |
|---|---|---|
| 693,707 | France | Sept. 1, 1930 |
| 613,098 | Germany | May 11, 1935 |
| 847,855 | Germany | Aug. 28, 1952 |